(12) United States Patent
Kremerman (10) Patent No.: US 11,084,009 B2
(45) Date of Patent: Aug. 10, 2021

(54) MAGNETIC SPINNER DEVICE WITH OFF CENTER MOTOR AND SPACED APART MAGNETS

(71) Applicant: Elliot Kremerman, Los Gatos, CA (US)

(72) Inventor: Elliot Kremerman, Los Gatos, CA (US)

( * ) Notice: Subject to any disclaimer, the term of this patent is extended or adjusted under 35 U.S.C. 154(b) by 0 days.

(21) Appl. No.: 17/101,120

(22) Filed: Nov. 23, 2020

(65) Prior Publication Data

US 2021/0071671 A1 Mar. 11, 2021

Related U.S. Application Data

(60) Provisional application No. 63/080,209, filed on Sep. 18, 2020.

(51) Int. Cl.
| | | |
|---|---|---|
| *F04D 13/02* | (2006.01) | |
| *F04D 19/00* | (2006.01) | |
| *F04D 13/06* | (2006.01) | |
| *H02K 49/10* | (2006.01) | |
| *B01F 15/06* | (2006.01) | |
| *B01L 9/00* | (2006.01) | |
| *B01F 13/08* | (2006.01) | |
| *B01F 15/00* | (2006.01) | |

(52) U.S. Cl.
CPC ............ *B01F 15/065* (2013.01); *B01L 9/00* (2013.01); *F04D 13/024* (2013.01); *F04D 13/06* (2013.01); *F04D 19/002* (2013.01); *H02K 49/104* (2013.01); *B01F 13/08* (2013.01); *B01F 2015/00584* (2013.01); *B01F 2015/00597* (2013.01)

(58) Field of Classification Search
CPC .......... B01F 13/08; B01F 15/065; B01L 9/00; F04D 13/024; H02K 1/18; H02K 5/00; H02K 5/04; H02K 49/108
USPC ........................................................ 366/274
See application file for complete search history.

(56) References Cited

U.S. PATENT DOCUMENTS

| | | | | |
|---|---|---|---|---|
| 8,282,268 B2 * | 10/2012 | Karkos, Jr. | ............ | A47J 43/085 366/273 |
| 2008/0013400 A1 * | 1/2008 | Andrews | ............. | B01F 13/0818 366/147 |
| 2012/0291637 A1 * | 11/2012 | Yu | ......................... | A47J 27/004 99/453 |

* cited by examiner

*Primary Examiner* — Elizabeth Insler
(74) *Attorney, Agent, or Firm* — Michael J. Feigin, Esq.; Feigin and Fridman LLC (57) ABSTRACT

A magnetic spinner device using an impeller system to disperse heat and stir contents there-above is disclosed herein. A motor turning the impeller is offset from a center line extending vertically through the device. The impeller, however, is centered with fan blades pushing air downwards as heat rises from a heat source placed there-below, such as between legs which support the impeller and bowl of the device, the bowl being used to hold a flask and/or substances to be heated. In this manner, the electric parts (the motor) and spared the brunt of the heat by being off-center while the heat rises upwards. The simplification of parts leaves less points of potential failure compared to the prior art as does the movement of electric parts away from being above a heat source.

20 Claims, 11 Drawing Sheets

ND SPACED APART
MAGNETIC SPINNER DEVICE WITH OFF CENTER MOTOR AND SPACED APART MAGNETS

FIELD OF THE DISCLOSED TECHNOLOGY

The disclosed technology relates generally to distillation and, more specifically, to impeller systems.

SUMMARY OF THE DISCLOSED TECHNOLOGY

A heating system with impeller is disclosed herein. A motor turning the impeller is offset from a center line extending vertically through the device. The impeller, however, is centered with fan blades pushing air downwards as heat rises from a heat source placed there-below, such as between legs which support the impeller and bowl of the device, the bowl being used to hold a flask and/or substances to be heated. In this manner, the electric parts (the motor) and spared the brunt of the heat by being off-center while the heat rises upwards. The fan blades, in turn, dissipate some of the upward extending heat in order to more evenly heat the substances there-above the bowl. As the fan blades and magnets forming in impeller and within a same housing, only a single motor and belt are needed to rotate each. The simplification of parts leaves less points of potential failure compared to the prior art as does the movement of electric parts away from being above a heat source.

In one embodiment, a first housing has magnets therein. The housing has a portal opening to an upper side thereof which has a narrower middle section and wider outer sections which keep the magnets separated from each other. A lip extends around the bottom side of the wider sections (interrupted, in some embodiments) by the narrower section, and more specifically, flanges of the narrower section which extend towards each other. This creates two rectangular areas on either side of the portal with an narrower rectangular section (for example) between the rectangular sections on each side of the portal. The lip causes a bottom side of the portal to have a smaller width than the magnets such that a space below the magnets is created. A plate, such as a magnetizable plate, is sized to fit, and/or is placed within the lower (indented) portion of the portal surrounded by the lip. The magnets can have polarities facing the same direction, upwards or downwards. This system allows heat to dissipate (spaced region between the magnets centered in the housing) while combining the magnetic forces of the two magnets into the magnetizable plate as the rectangular prism magnets are abutted against the magnetic plate.

For purposes of this disclosure, "top" refers to how the device is typically oriented relative to the ground. "Bottom" is towards the ground, how the device is typically used, e.g. with the legs towards/at the bottom and bowl towards/at the top.

The first housing has a lower spindle (flange, circular or otherwise) which is under or centered under the narrower middle section with, in embodiments of the disclosed technology, fan blades which are angled to push air downwards and/or push air downwards when the first housing is spinning. A bowl can be centered above the first housing, centered above the fan blades and/or narrower middle section and/or first housing. The two magnets, in embodiments of the disclosed technology, have poles facing in a same upwards and same downwards direction, equally distantly offset from a vertical center line of the first housing (e.g. a same distance from a center point of the first housing).

The first reel (a type of washer with exterior flanges or a circular device adapted to be rotated by and/or rotate a belt extending there-around) is attached to a belt and rotates with and/or rotates the spindle of the first housing. Thus, the reel is rotated by a belt and, in turn, rotates the first housing and impeller (rotating magnets therein). The belt is further connected to a second reel which is turned by way of a motor. The first reel is centered along vertical line extending through the elongated length of the spindle. The second reel is off-center as is the motor.

A spacer is between the first housing and a second housing, the second housing holding therein or adapted to hold therein the belt and reels. The spindle can pass through a center portal of the spacer allowing the rotational forces to be transferred through the center portal thereof. The spacer further has, in embodiments of the disclosed technology, three, four, or more outer portals through which legs pass through and are held abutted to the spacer, such as by way of caps which screw on.

Heat extending upwards from a heat source, such as one centered between the legs, extends towards the fan blades and is pushed downwards by the fan blades causing a more even heating of the bowl while said two rectangular prism shaped magnets rotate with the fan blades.

"Functionally connected" is defined as "having a continuous passageway for vapors or liquids to pass through." "Collector" is defined as "a device which is closed except for portals of entry or exit for gases or liquids, each portal being within a single side of a respective collector." "Fraction collector" is defined as "a device used to collect individual portions of mixtures separated through distillation, the separated portions being partially, substantially, or fully condensed therein". "Cooling jacket" is defined as "a hollow part of a device through which coolant, such as water, flows such that a temperature of an area which the hollow part surrounds is lowered".

A "distillation apparatus" is defined as a device in which vapors of a solid, liquid, or combination solid and liquid product to be distilled move upwards therein before exiting therefrom such as into a distribution adapter or condenser. "Distillate" refers to, and is defined as, the vapor, liquid, or combination thereof which exits, by way of the fraction collector, from the distillation head and is ultimately fractionally distilled into component parts, each component part having different physical properties such as a different boiling point.

"Circumference" is defined as "measure of a length of a circular or ovoid enclosing boundary of a named part of the device described herein".

The cooling jacket intake is, in some embodiments of the disclosed technology, situated horizontally inline with the cooling jacket outtake. In other embodiments, all horizontal planes passing through the cooling jacket intake are below all horizontal planes passing through the cooling jacket outtake, and the cooling jacket outtake is vertically inline with the side exit portal.

Described differently, a distillation apparatus of embodiments of the disclosed technology has a first continuous internal region extending from a bottom end of the apparatus to a side exit portal. A cooling jacket with a second continuous internal region, forming a separate interior space than the first continuous internal region, surrounds a portion of a vertical extent of the continuous internal region. At least a part of an interior wall of the cooling jacket is simultaneously a part of said exterior wall of the vertical extent. In some embodiments, the internal region may extend below the cooling jacket.

"Vertical extent" is defined as "a portion which has a vertical length throughout which its cross-sections are substantially identical".

The directional descriptors used in this disclosure, such as "top", "bottom", "vertical", "horizontal", "upper", "lower", "above", and "below" are relative to a typical direction of use with a heat source below the portion of the vertically-extending passageway substantially farthest from a top portal of the apparatus.

Any device or step to a method described in this disclosure can comprise, or consist of, that which it is a part of, or the parts which make up the device or step. The term "and/or" is inclusive of the items which it joins linguistically and each item by itself. Any element or described portion of the devices shown can be "substantially" as such, if used in the claims in this manner. Where used, "substantially" is defined as "within a 5% tolerance level thereof."

DETAILED DESCRIPTION OF EMBODIMENTS OF THE DISCLOSED TECHNOLOGY

A magnetic spinner device using an impeller system to disperse heat and stir contents there-above is disclosed herein. A motor turning the impeller is offset from a center line extending vertically through the device. The impeller, however, is centered with fan blades pushing air downwards as heat rises from a heat source placed there-below, such as between legs which support the impeller and bowl of the device, the bowl being used to hold a flask and/or substances to be heated. In this manner, the electric parts (the motor) and spared the brunt of the heat by being off-center while the heat rises upwards. The fan blades, in turn, dissipate some of the upward extending heat in order to more evenly heat the substances there-above the bowl. As the fan blades and magnets forming in impeller and within a same housing, only a single motor and belt are needed to rotate each. The simplification of parts leaves less points of potential failure compared to the prior art as does the movement of electric parts away from being above a heat source.

Embodiments of the disclosed technology will become more clear in view of the following description of the figures.

Figure 1:
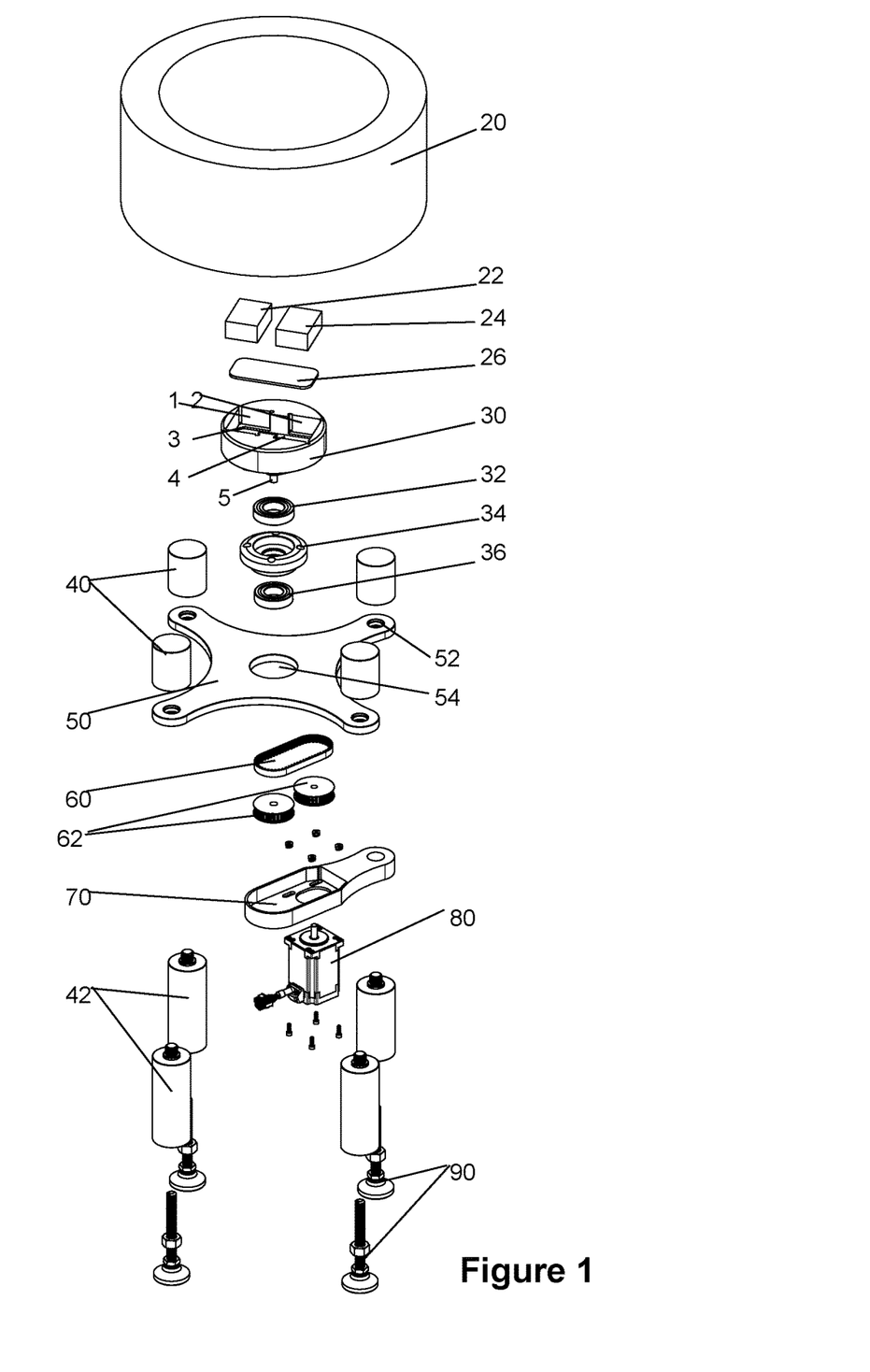
FIG. 1 shows a top and side exploded perspective view of a magnetic spinner system in an embodiment of the disclosed technology.
Figure 2:
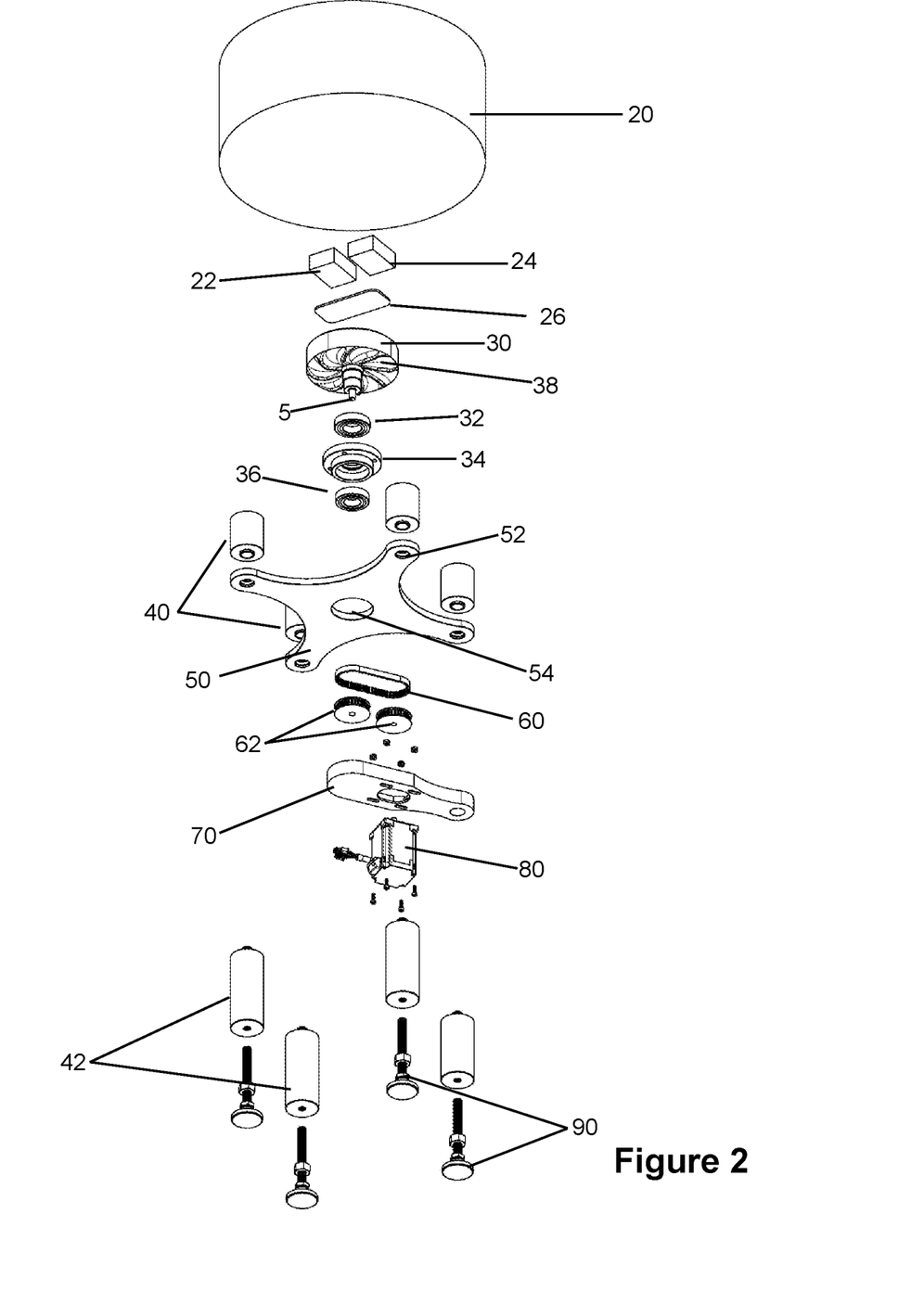
FIG. 2 shows a bottom and side exploded perspective view thereof.

Discussing FIGS. 1 and 2, FIG. 1 shows a top and side exploded perspective view of a magnetic spinner system in an embodiment of the disclosed technology and FIG. 2 shows a bottom and side exploded perspective view thereof. From bottom to top, feet 90 support support legs 42. The feet are adjustable height and in some embodiments, have a screw or elongated connected extending upwards through legs 42. The legs can fasten to the feet by rotatably connected to same. A spaced 50 attaches or rests on the legs 42. The attachment mechanism, in one embodiment of the disclosed technology, are threaded caps 40 which thread onto the legs 42 such that the spacer 50 is between the caps 40 and legs 42. There can be three, four, five, or more legs with corresponding feet and portals 52 of the spacer 50. The portals 52 are where connector regions of the legs 42 pass through to connect to the caps 40.

Now discussing the spacer and elements attached thereto, a lower housing 70 is abutted and/or connected to and/or held against the spacer. The lower housing 70 can be held in place by way of a portal attached between one of the legs 42, spacer 50 (portal 52), and a cap 40. The lower housing has a motor 80 whose business end (spindle 5 which rotates) extends through a lower portal (unnumbered) of the lower housing 70 and connects to a reel 62, which is a type of washer or gear with teeth around the circumference. A belt 60 causes rotation of one of the reels to rotate the other reel. The reel situated directly over the motor 80 is off-center. When "center" is used in this disclosure, this refers to a vertical line which passes through the portal 54 of the spacer 50 and which is typically equidistant from the legs 42 and/or passes through the spindle 5 (lower elongated extent) of the top housing 30.

The off-center placement of the motor allows heat generated by a heat source below the device/parts shown in FIGS. 1 and 2 to rise without being blocked there-above by the motor. The heat generated also causes less harm or strain on the motor compared to a centered position motor since the heat can extend upwards more centered than the motor rather than being directly under the motor.

Returning now to the lower housing, the lower housing 70 is held against a lower side of the spacer 50. The top housing has a lower spindle 5 which extends into one of the reels 62. Washers 32, 34, and 36, which are above, within, and below the portal 54 of the spacer (in some embodiments) reduce friction allowing the upper housing 30 to spin as the spindles 62 spin. The upper housing 30 is centered at the spindle. The upper housing comprises a top portal which is discussed in more detail below.

Within the top portal are wider sections 1 and 2 as well as a narrow section 4 made narrower by a flange extending into what would otherwise be a rectangular portal, in embodiments of the disclosed technology. A bottom side of the upper housing 30 has an indented region 3 surrounded by, or mostly by, or partially by a lip 6. The lip 6 can be of any size or shape and prevents rectangular prism or other shaped upper magnets from falling into the indented region. The magnets 22 and 24 are spaced apart, leaving a space in the center of the upper housing allowing heat to rise there-above unhindered by the magnets at the center line/center area of the devices (e.g. a vertical line equidistant from the legs 42).

The magnets 22 and 24 are sized such that in at least one orientation, and in some embodiments, two orientations, and in some embodiments, three orientations each 90 degrees offset from one of the other orientations, the magnets are unable to rest flat within the indented region 3. A plate 26 fits within indented region such that a most elongated and second most elongated distance at right or perpendicular angles to each other are normal to the vertical center. The magnets 22 and 24 abut the plate 26 magnetizing the plate 26 such that a magnetic field extends across the plate 26. This magnetic field is stronger than the two magnets separately as it joined into a single extended magnetic field, comparatively. It should be understood that any magnetic configuration can be used in other embodiments of the disclosed technology as long as the magnets are able to turn an impeller by way of magnetic force.

A bowl 20 is situated above the elements 1 to 4 and 28 to 90 in embodiments of the disclosed technology. The bowl can have a flask, glassware, or other device held therein along with a substance (solid, liquid, or combination thereof) to be heated and/or spun (stirred). The heat rising upwards can extend vertically with minimal blockage by parts between the bowl 20 and the heat source. These parts, in some embodiments, which are at the vertical center line are limited to, in some embodiments, the bowl 20, the plate 26 (which is made relatively thin and has a very low heat capacity), the upper housing 30, one of the reels 62, and the lower housing 70. The motor 80 and magnets 22/24 are outside of the vertical center in such embodiments of the disclosed technology.

Referring now specifically to FIG. 2, fan blades 38 are shown which spin with the upper housing 30 causing air, in some embodiments, to be pushed downwards causing a more even flow of upward air towards the bowl 20.

Figure 3:
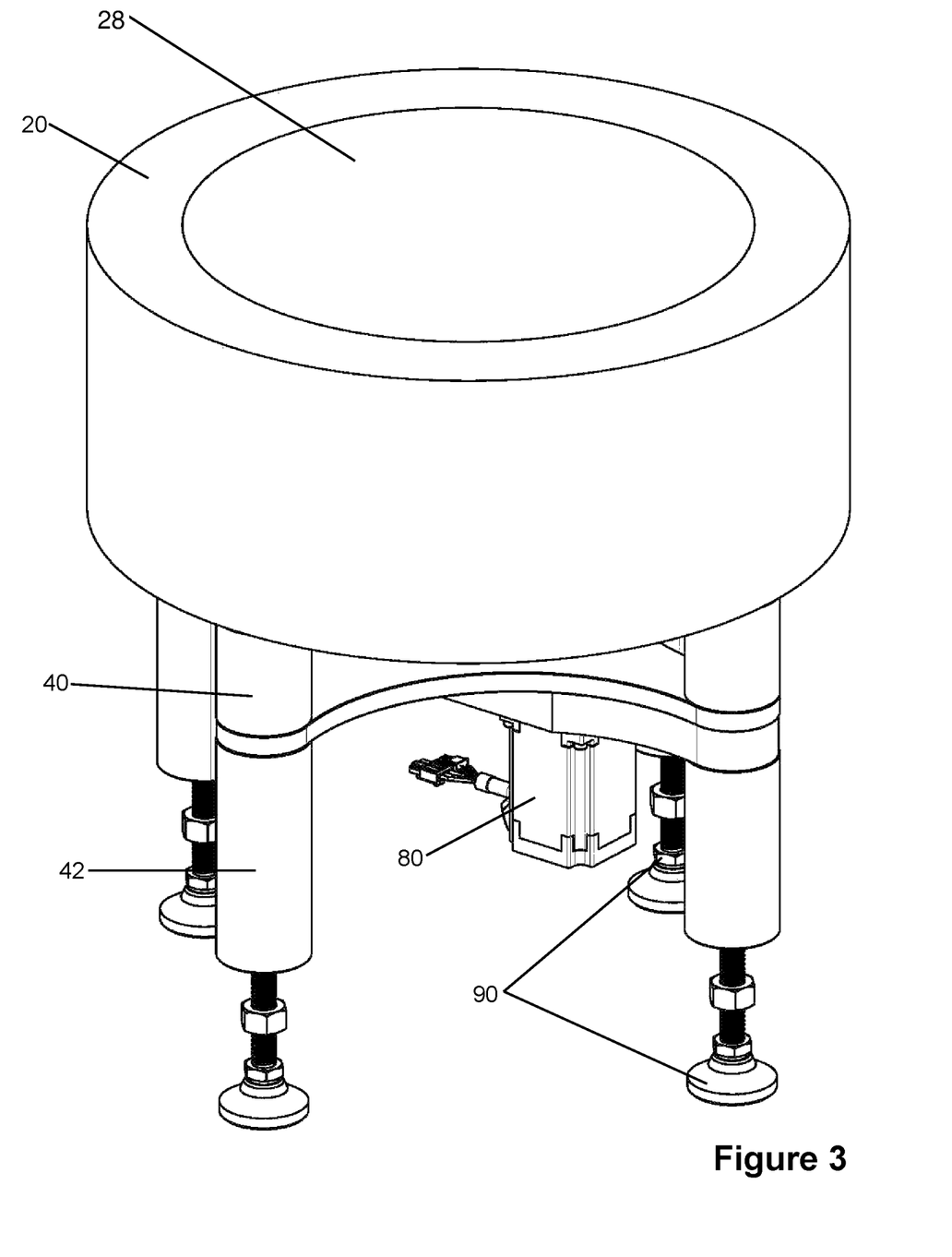
FIG. 3 shows a top and side perspective view thereof.
Figure 4:
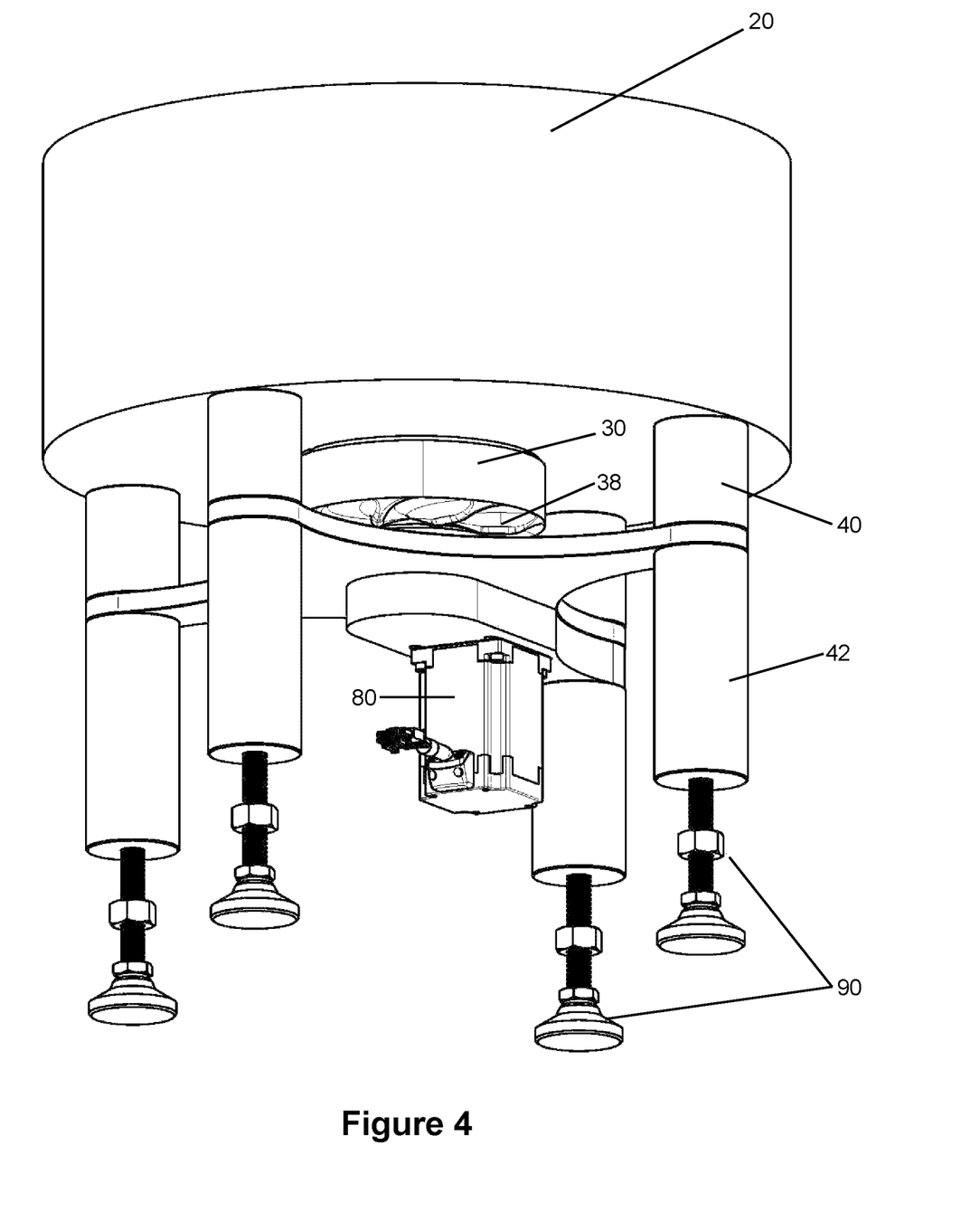
FIG. 4 shows a bottom and side perspective view thereof.
Figure 5:
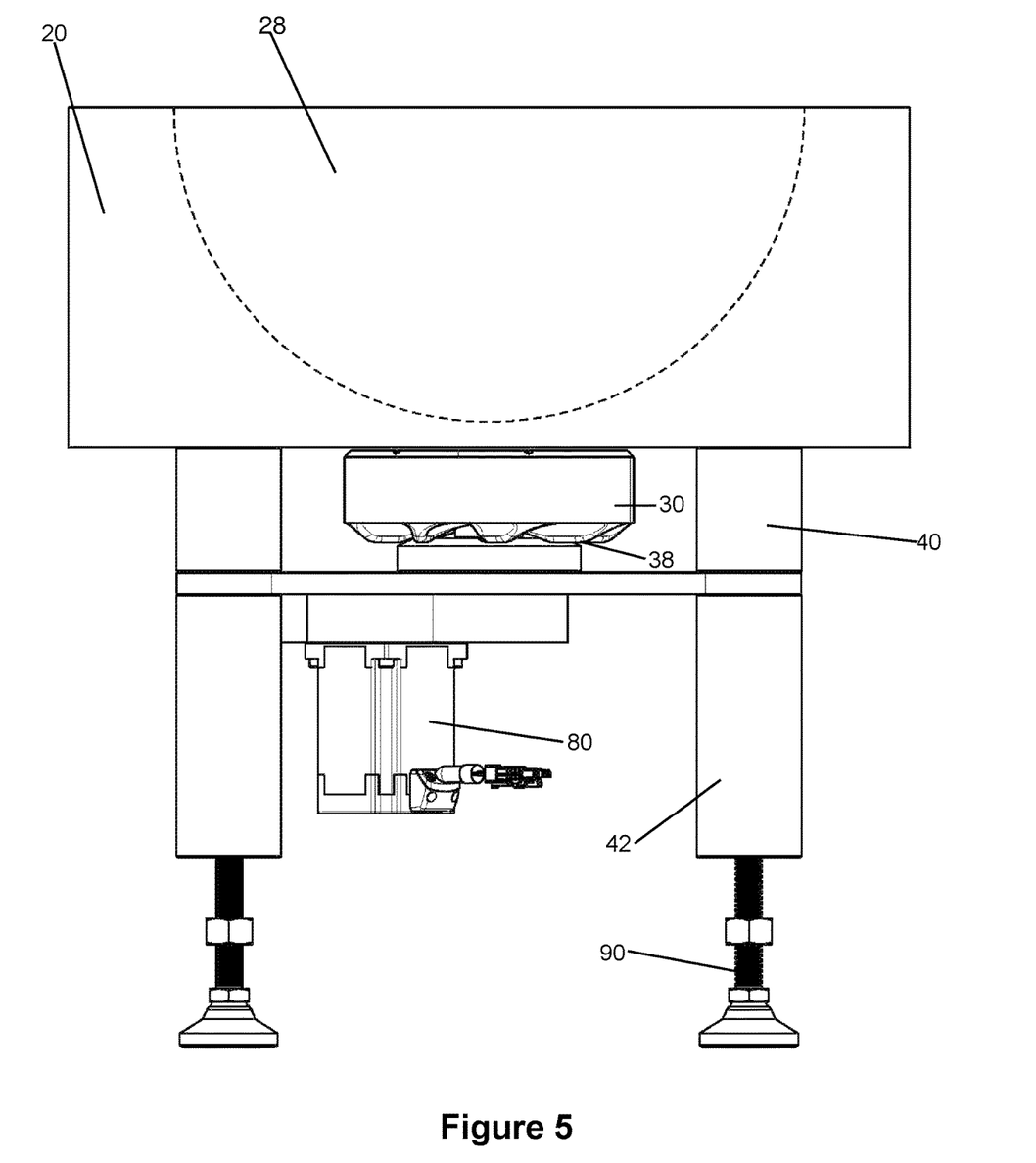
FIG. 5 shows a side elevation view thereof.

Referring now to FIGS. 3, 4 and 5, FIG. 3 shows a top and side perspective view thereof. FIG. 4 shows a bottom and side perspective view thereof. FIG. 5 shows a side elevation view thereof. The bowl 20 is seen with an interior region 28. The interior region is where a flask and/or material to be heated and/or stirred in placed. The upper housing 30 is shown above a washer 34, spacer 50, and lower housing 70. The lower housing 70 is held against the spacer 50 by way of placement between a leg 52 and cap 40. The motor 70 is seen off-center and the fan blades 38 are seen at the bottom side of the top housing 30. The fan blades dissipate heat above the separator 50 such that the heat has turbulent flow outwards and up towards the entire base of the bowl making for even heating at the bottom side of the bowl. The fan blades can have spaces above and below or terminate at a solid upwards side such that portals are between the blades which open only at a bottom side.

Figure 6:
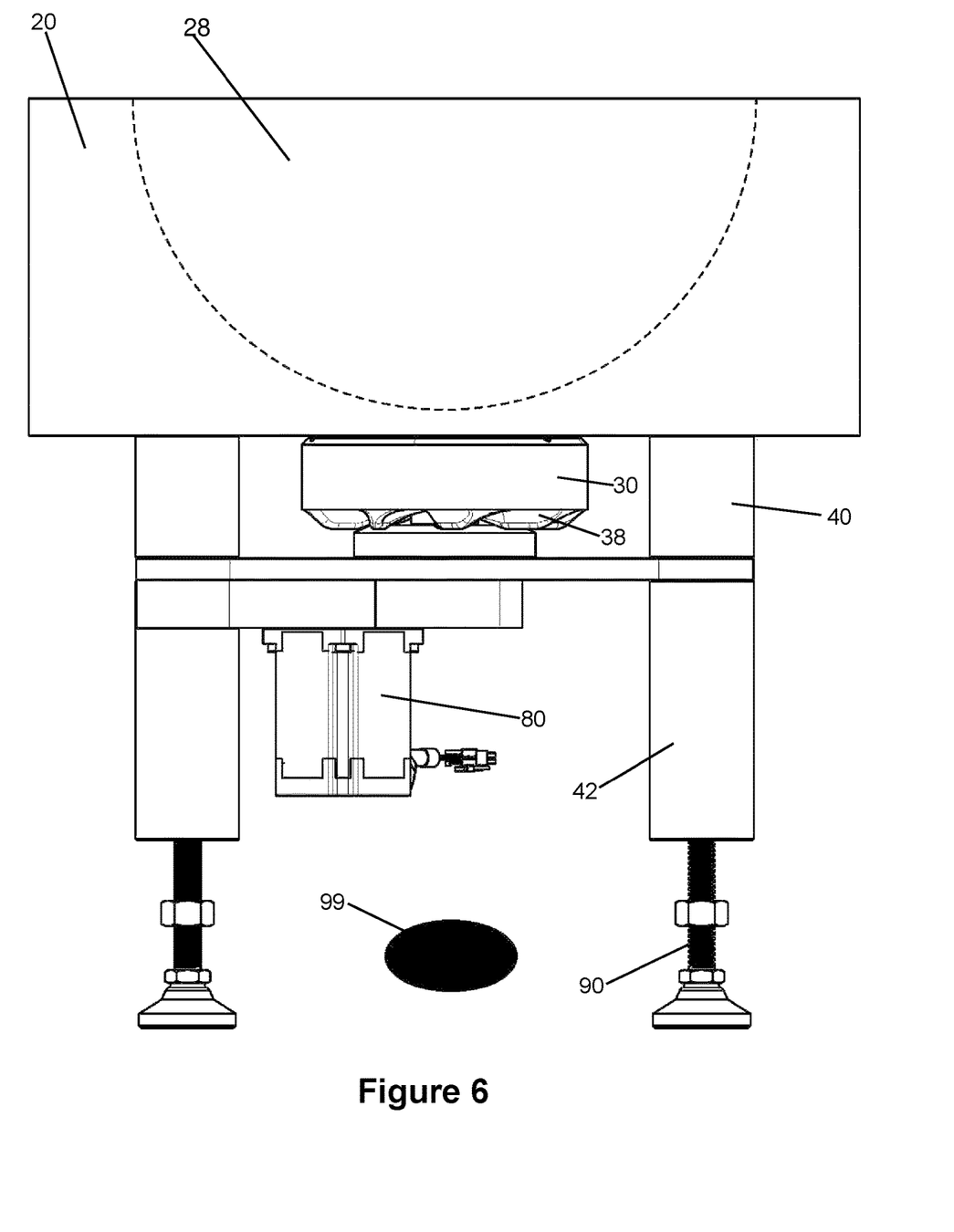
FIG. 6 shows an elevation view thereof with a heat source below the magnetic spinner system.
Figure 7:
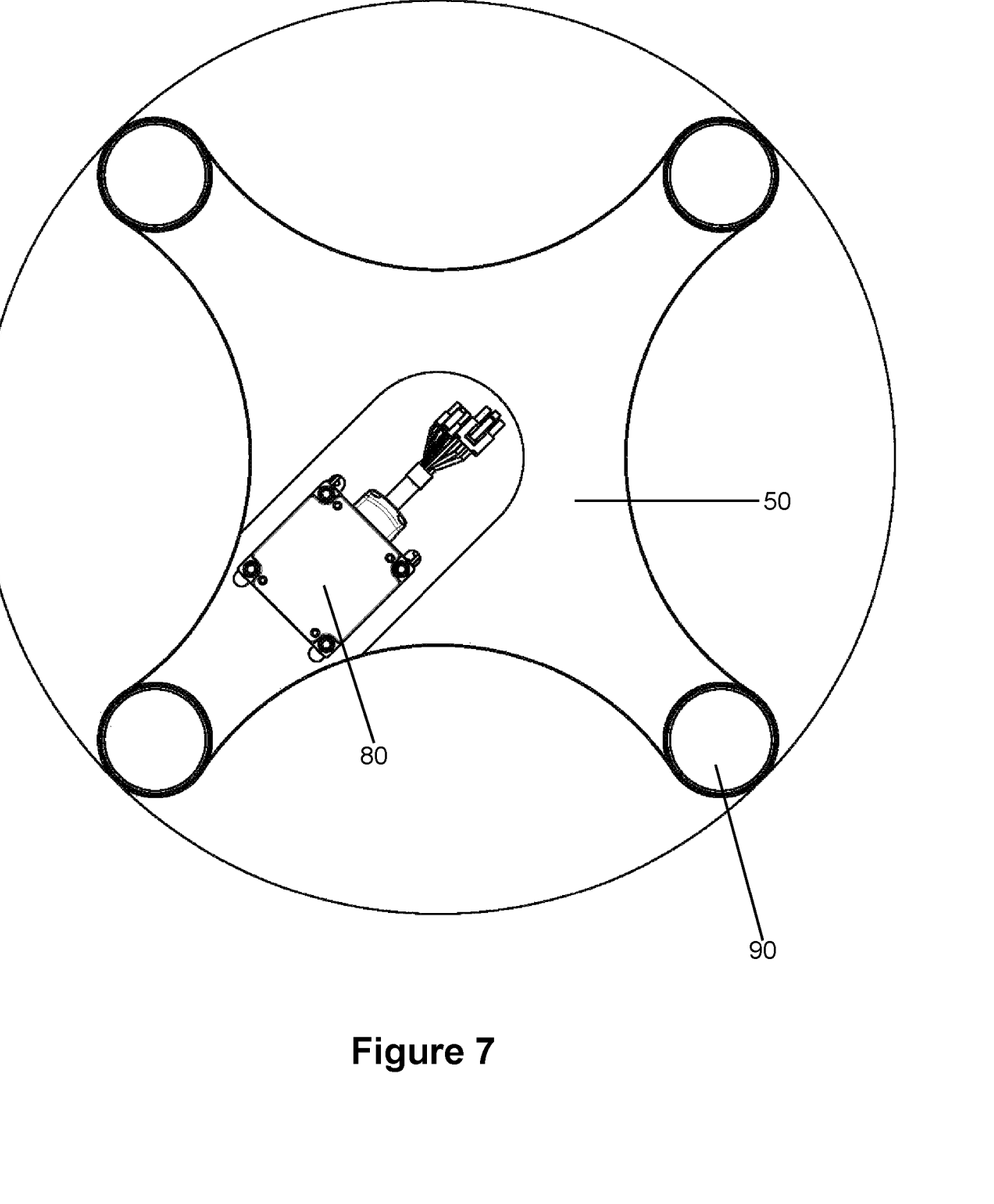
FIG. 7 shows a bottom plan view thereof.
Figure 8:
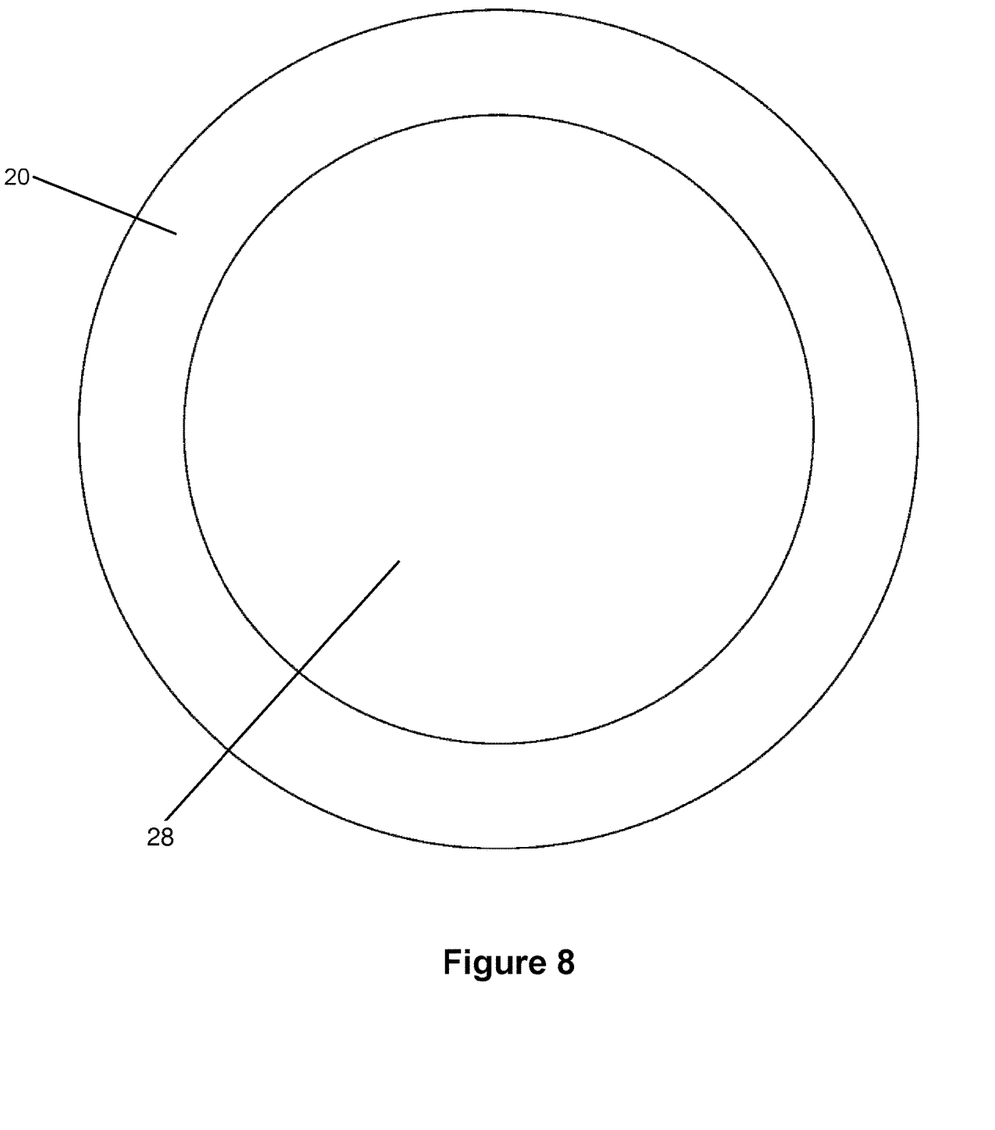
FIG. 8 shows a top plan view thereof.

FIG. 6 shows an elevation view thereof with a heat source below the magnetic spinner system. FIG. 7 shows a bottom plan view thereof. FIG. 8 shows a top plan view thereof. The heat source 99 can be from a flame/fire or other sources of heat known in the art. In some embodiments, the heat source 99 is centered or substantially centered below the bowl.

Figure 9:
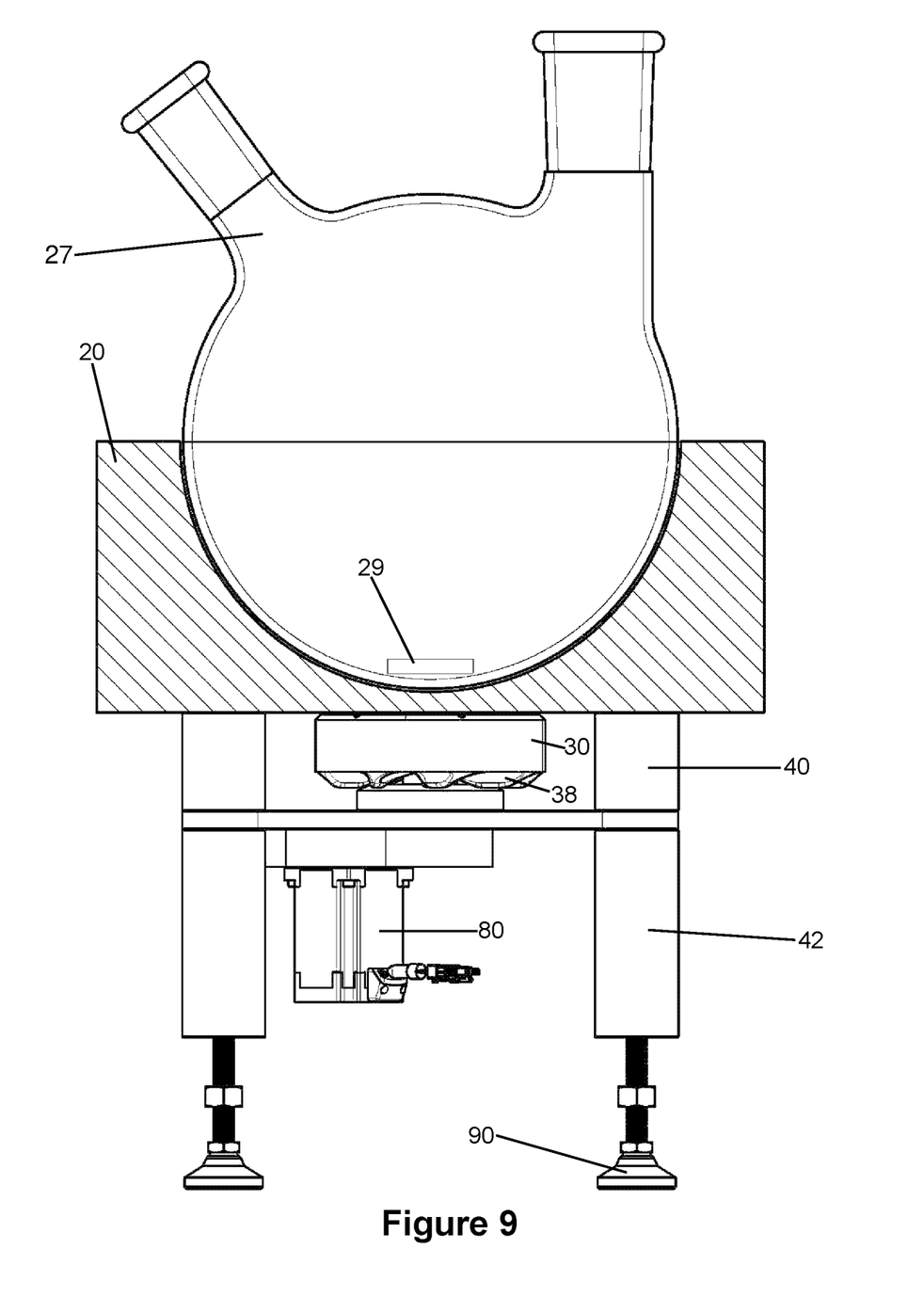
FIG. 9 shows a side elevation view thereof with a flask placed therein.

FIG. 9 shows a side elevation view thereof with a flask placed therein. The flask 27 has an impeller 29 at the bottom thereof which substantially has an equal length from one end to an opposite end as that the bowl 28. This allows for efficient turning of the impeller 29 with the top housing 30.

Figure 10:
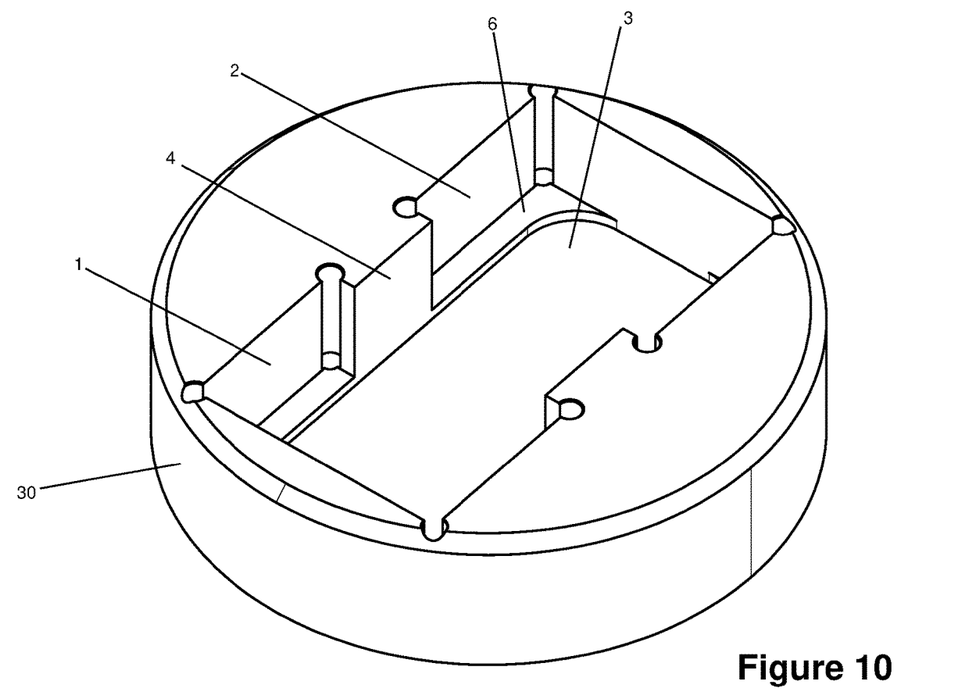
FIG. 10 shows a top perspective view of the upper housing thereof.
Figure 11:
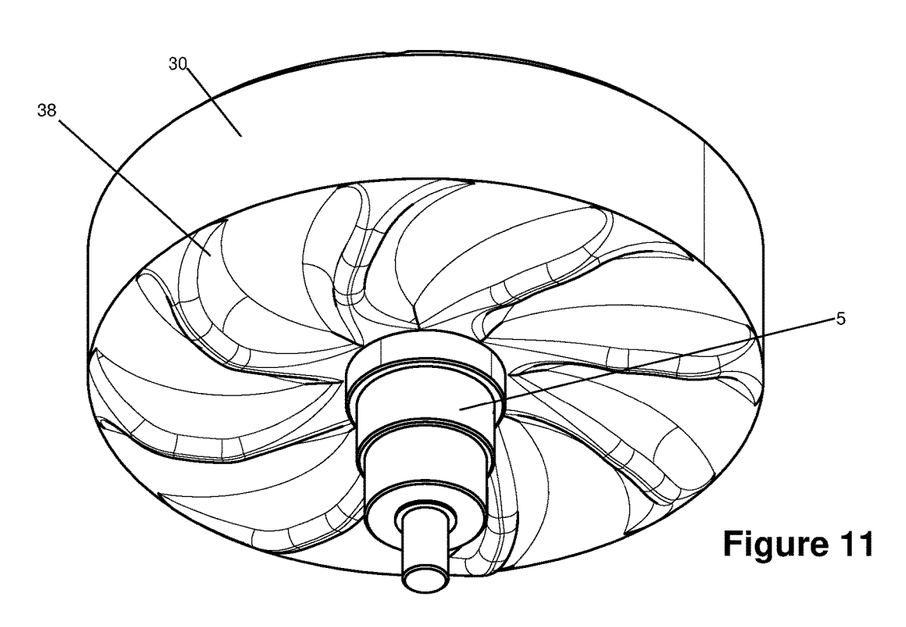
FIG. 11 shows a bottom perspective view of the upper housing thereof.
Figure 12:
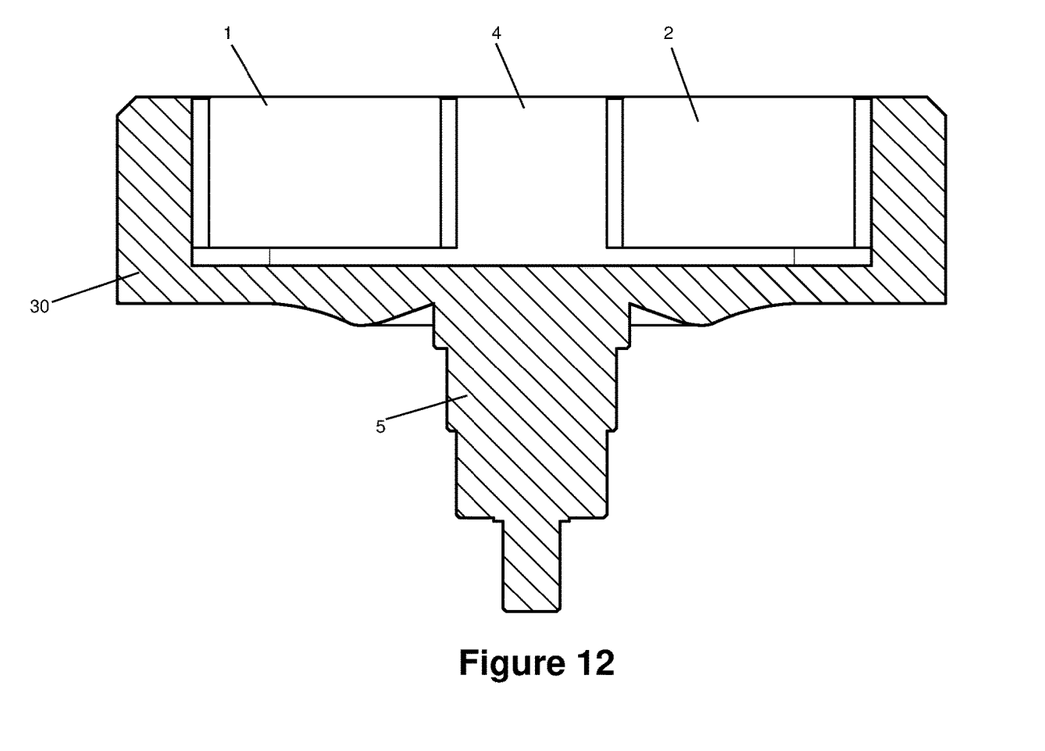
FIG. 12 shows a side cutaway view of the upper housing thereof.

Referring now to the upper housing in specific, FIG. 10 shows a top perspective view of the upper housing thereof. FIG. 11 shows a bottom perspective view of the upper housing thereof. FIG. 12 shows a side cutaway view of the upper housing thereof. The upper housing 30 is circular in embodiments of the disclosed technology so that it can rotate evenly. The centrifugal force while spinning causes the substances, magnets, to be forced towards the outer edges of the upper housing. The magnets, such as rectangular prism magnets, fit into each of the wider regions 1 and 2 respectively. The narrower region 4 has flanges extending towards each other as shown which prevents the magnets in each cavity 1 and 2 from moving towards each other, blocked in place by the narrow region 4. An indentation 3 is sized to fit a plate such as a metal and/or magnetizable plate having low heat capacity (1000 Joules per kilogram degree Celsius).

On the bottom side of the upper housing 30 the fan blades 38 are visible which are, in embodiments of the disclosed technology, which are fixed with and form a unitary structure with the body of the upper housing 30. The fan blades therefore spin with the upper housing 30 causing air to be pushed downwards. The spindle 5 can have a plurality of descending circumference sections which are each sized to fit in a washer, such as washers 32, 34, and 36 while the end of the spindle is rotatably connected within one of the reels 62.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

The invention claimed is:

1. An impeller system comprised of:
a first housing rotatably abutted or connected to at least one washer said first housing comprising an upper surface, a closed lower surface, a portal extending downwardly into said first housing forming a cavity within said first housing that extends from said upper surface to said closed lower surface, said portal having two oppositely disposed wider sections extending from a peripheral edge of said first housing radially inwardly to a center of said first housing, a pair of magnets including a first magnet disposed in one of said wider sections and a second magnet disposed in the other of said wider sections, a pair of opposite flanges separating said wider sections, said flanges extending radially inwardly toward said center forming a horizontally narrower vertically-centered middle section defining a middle gap extending between said magnets, said wider sections, and said flanges, and said middle gap extending from the upper surface to the closed lower surface, said horizontally narrower vertically-centered middle section smaller in width than said wider sections.

2. The impeller system of claim 1, further comprising: a lower indented section disposed within said portal, said lower indented section extending across said wider sections and said horizontally narrower vertically-centered middle section forming a recessed area spanning a lower end of said portal beneath said wider sections, said horizontally narrower vertically-centered middle section, and said flanges; and
a plate surrounded, at least in part, by said lower indented section;
wherein a portion of said first housing extends below a portion of said plate.

3. The impeller system of claim 2, wherein said magnets are separately abutted against said plate.

4. The impeller system of claim 3, wherein said wider sections of said housing are a rectangle with a portal opening formed between said flanges and said narrower vertically-centered middle section.

5. The impeller system of claim 4, wherein said first housing further comprises a lip interrupted by said flanges of said narrower middle section, said lip forming a perimeter of said lower indented section.

6. The impeller system of claim 5, wherein said magnets comprise two rectangular prism shaped magnets.

7. The impeller system of claim 6, wherein each of said two rectangular prisms is abutted against said plate.

8. The impeller system of claim 7, wherein said first housing forms a unitary structure with a lower spindle under said narrower middle section;
wherein an entirety of said spindle is below a bottom surface of said first housing.

9. The impeller system of claim 8, wherein a bowl is centered above said first housing.

10. The impeller system of claim 9,
wherein each of said two rectangular prisms has a north side facing upwards towards said bowl and a south side facing in an opposite downward direction; or
wherein each of said two rectangular prisms has a south side facing upwards towards said bowl and a north side facing in an opposite downward direction.

11. The impeller system of claim 10, wherein said spindle extends through a first reel, said first reel connected by a belt to a second reel, said second reel being rotatable by way of a motor causing said first housing to rotate, byway of said first reel, belt, and said second reel.

12. The impeller system of claim 11,
wherein said first reel, said second reel, and said belt are in a second housing abutted against a spacer; and
wherein said first housing is abutted against said spacer.

13. The impeller system of claim 12,
wherein said spacer comprises a central portal through which said spindle of said first housing extends and four portals equi-spaced from said central portal.

14. The impeller system of claim 13,
wherein through each of said four portals of said spacer a part of a leg passes there-through, each said leg elongated in a vertical direction.

15. The impeller system of claim 14, wherein four caps abut an upper side of said spacer and hold a respective leg of said four legs to a lower side of said spacer.

16. The impeller system of claim 15, wherein:
said motor is within an area circumscribed by a perimeter of a lower most side of said bowl and off-center with respect to said bowl;
said first housing is centered with respect to said bowl.

17. The impeller system of claim 16, said plate is magnetized by said two rectangular prism shaped magnets.

18. The impeller system of claim 17, wherein said first housing forms a unitary structure with fan blades closed to a top of said first housing and open to a bottom of said first housing.

19. The impeller system of claim 18, wherein said system is adapted for placement of a heat source between said four legs.

20. The impeller system of claim 19, wherein heat extending upwards from said heat source, said heat source being substantially centered between said legs, extends towards said fan blades and is pushed downwards by said fan blades causing a more even heating of said bowl while said two rectangular prism shaped magnets rotate with said fan blades.

* * * * *